(12) United States Patent
Huenink

(10) Patent No.: US 8,151,757 B2
(45) Date of Patent: Apr. 10, 2012

(54) OIL PAN/AXLE SUPPORT

(75) Inventor: Brian M. Huenink, Hudson, IA (US)

(73) Assignee: Deere & Company, Moline, IL (US)

( * ) Notice: Subject to any disclaimer, the term of this patent is extended or adjusted under 35 U.S.C. 154(b) by 428 days.

(21) Appl. No.: 12/465,738

(22) Filed: May 14, 2009

(65) Prior Publication Data

US 2010/0288223 A1 Nov. 18, 2010

(51) Int. Cl.
*B62D 25/20* (2006.01)
*F02B 75/22* (2006.01)
*F02B 67/00* (2006.01)
*F02F 1/10* (2006.01)
*F02F 7/00* (2006.01)
*F16M 1/00* (2006.01)
*F16N 31/00* (2006.01)

(52) U.S. Cl. ............ 123/195 R; 123/195 A; 123/195 C; 184/106; 180/69.1

(58) Field of Classification Search .............. 123/195 R, 123/195 C, 195 A, 1 A, 27 A, 90.34, 196 M, 123/41.42; 184/106
See application file for complete search history.

(56) References Cited

U.S. PATENT DOCUMENTS

| | | | |
|---|---|---|---|
| 1,265,086 A | 5/1918 | Jacobs | |
| 1,331,518 A | 2/1920 | Mohr | |
| 2,024,099 A | 12/1931 | Hofweber et al. | |
| 2,254,358 A * | 9/1941 | Frudden et al. | 180/291 |
| 3,052,313 A | 7/1959 | Hooven | |
| 3,213,958 A | 10/1965 | Muller | |
| 3,474,876 A | 10/1969 | Magnier | |
| 3,489,237 A | 1/1970 | Winsen et al. | |
| 3,580,350 A * | 5/1971 | Arkus-Duntov | 180/248 |
| 4,205,729 A * | 6/1980 | Morino | 180/55 |
| 4,633,961 A * | 1/1987 | Niskanen | 180/53.7 |
| 4,650,030 A | 3/1987 | Moriyama et al. | |
| 5,046,578 A | 9/1991 | Nakayama et al. | |
| 5,065,831 A * | 11/1991 | Murakami | 180/55 |
| 5,136,993 A * | 8/1992 | Ampferer et al. | 123/195 C |
| 5,152,364 A | 10/1992 | Woods et al. | |
| 5,236,061 A | 8/1993 | Haupt | |
| 5,879,016 A | 3/1999 | Altherr et al. | |

(Continued)

FOREIGN PATENT DOCUMENTS

DE 2537691 3/1977

(Continued)

OTHER PUBLICATIONS

7X30 series 6.8 L Pivot Beam Axle Frame.

(Continued)

*Primary Examiner* — Marguerite McMahon
*Assistant Examiner* — Tea Bajramovic

(57) ABSTRACT

The invention relates to an oil pan/axle support. There is a need for an oil pan/axle support which is a structural member and which places the front axle support in front of the engine. Such an oil pan/axle support includes a rigid structural housing capable of forming a portion of a frame of a vehicle. The housing has an aft portion and a forward portion. The aft portion forms an engine oil reservoir surrounded by a rim. The rim has an upwardly facing sealing surface for engagement with a block of an engine. The forward portion extends forward from the aft portion and forms a pair of fore-and-aft spaced apart pivot bores for receiving a front axle pivot pin so that the front axle is spaced forward with respect to a front portion of the engine.

7 Claims, 5 Drawing Sheets

U.S. PATENT DOCUMENTS

| | | | |
|---|---|---|---|
| 6,230,830 B1 * | 5/2001 | Chorney et al. | 180/53.6 |
| 6,470,991 B1 | 10/2002 | Bowman et al. | |
| 6,935,457 B2 | 8/2005 | Tsuda | |
| 7,219,642 B1 | 5/2007 | Kwiatkowski et al. | |
| 7,631,629 B2 * | 12/2009 | Terada | 123/192.2 |
| 2008/0283020 A1 * | 11/2008 | Bicker et al. | 123/196 R |
| 2009/0199810 A1 * | 8/2009 | Iida | 123/195 R |

FOREIGN PATENT DOCUMENTS

| | | |
|---|---|---|
| DE | 3316655 | 1/1988 |
| DE | 4032433 | 4/1992 |
| DE | 20309312 | 12/2003 |

OTHER PUBLICATIONS

8X30 series 9.0 L Pivot Beam Axle Oil Pan.
CNH Parts and Service Catalog, Puma 210 Case IH Tractor (1/07) 1.21.1(2) Front Axle Support (4WD), printed Aug. 26, 2008.
German Search Report (8 pages).

* cited by examiner

OIL PAN/AXLE SUPPORT

FIELD OF THE INVENTION

The present invention relates to an oil pan/axle support for a tractor.

BACKGROUND OF THE INVENTION

Upcoming emission regulations will require the use of additional engine accessories and components. It would be desirable to place such components above an engine, but this cannot be done if there is insufficient space above the engine. For example, there is insufficient space above the engine in a production John Deere 8000 Series tractors. This is because the tractor has an oil pan which serves as a structural member of the tractor frame, and because this structural oil pan supports an axle which is mounted below a front portion of the engine. This raises the position of the engine. It would be desirable to have a robust structural oil pan/axle assembly which permits the engine to be at a lower position, so as to maintain engine to transmission drop distances and maintain a space above the engine for additional components. In addition, to maintain or improve turning radius, attachments between the oil pan and the sides of the engine block should be avoided. Bolted joints between the oil pan and axle support should be avoided to reduce cost and complexity and to increase strength.

SUMMARY OF THE INVENTION

Accordingly, an object of this invention is to provide an oil pan/axle support unit which serves as a structural member of the tractor frame.

A further object of the invention is to provide such a an oil pan/axle support unit which supports an axle which is mounted in front of a front portion of the engine.

These and other objects are achieved by the present invention, wherein an oil pan/axle support includes a rigid structural housing capable of forming a portion of a frame of a vehicle. The housing has an aft portion and a forward portion. The aft portion forms an engine oil reservoir surrounded by a rim. The rim has an upwardly facing sealing surface for engagement with a block of an engine. The forward portion extends forward from the aft portion and forms a pair of fore-and-aft spaced apart pivot bores for receiving a front axle pivot pin so that the front axle is spaced forward with respect to a front portion of the engine.

DESCRIPTION OF THE PREFERRED EMBODIMENT

Referring to FIGS. 1-5, an oil pan 10 is formed by a rigid structural housing 12, such as a casting, which is capable of forming a portion of a frame of a vehicle (not shown). The housing 12 includes an aft portion 14 and a forward portion 16.

Figure 1:
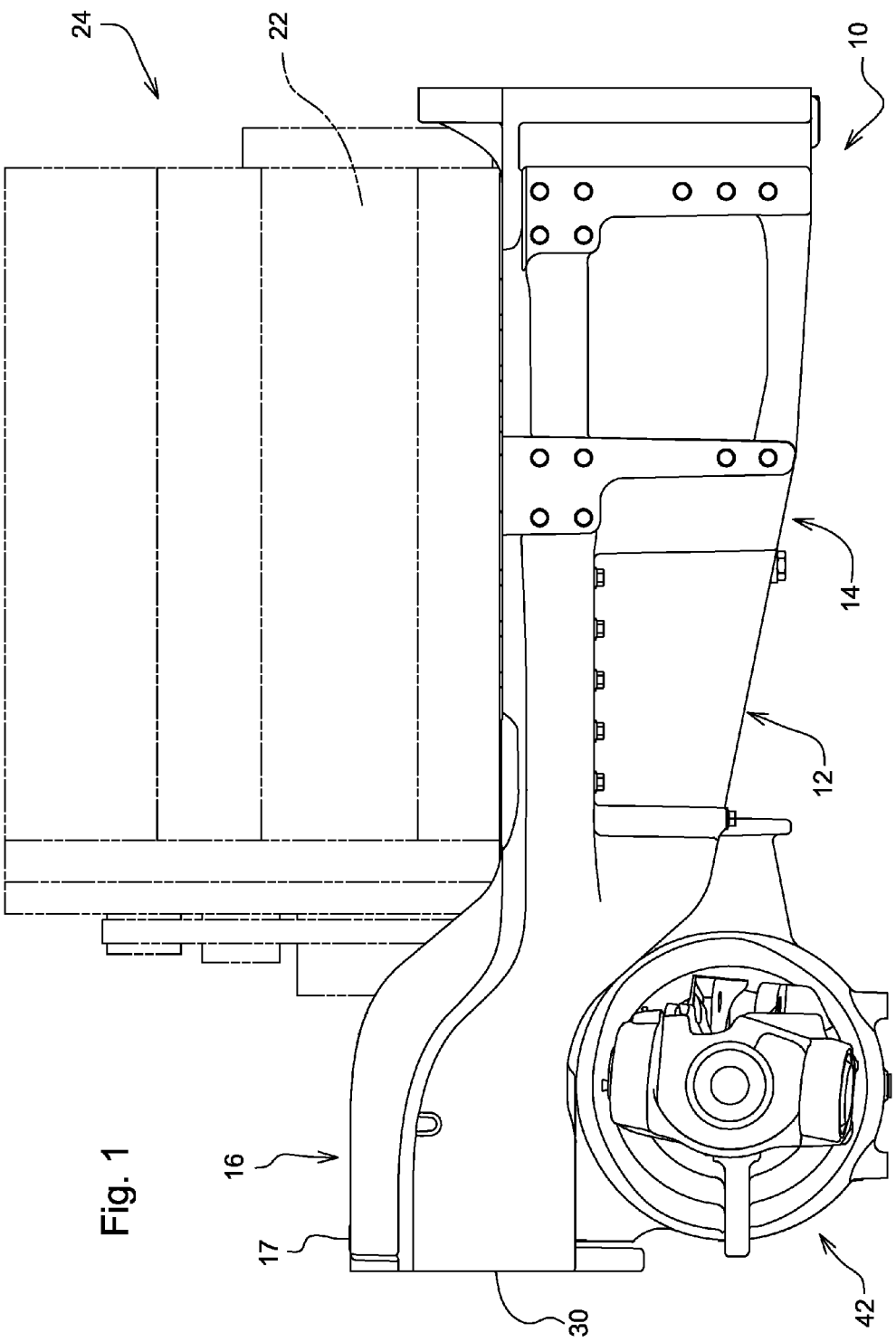
FIG. 1 is a side view of an oil pan embodying the invention assembled to an engine and a front axle.
Figure 2:
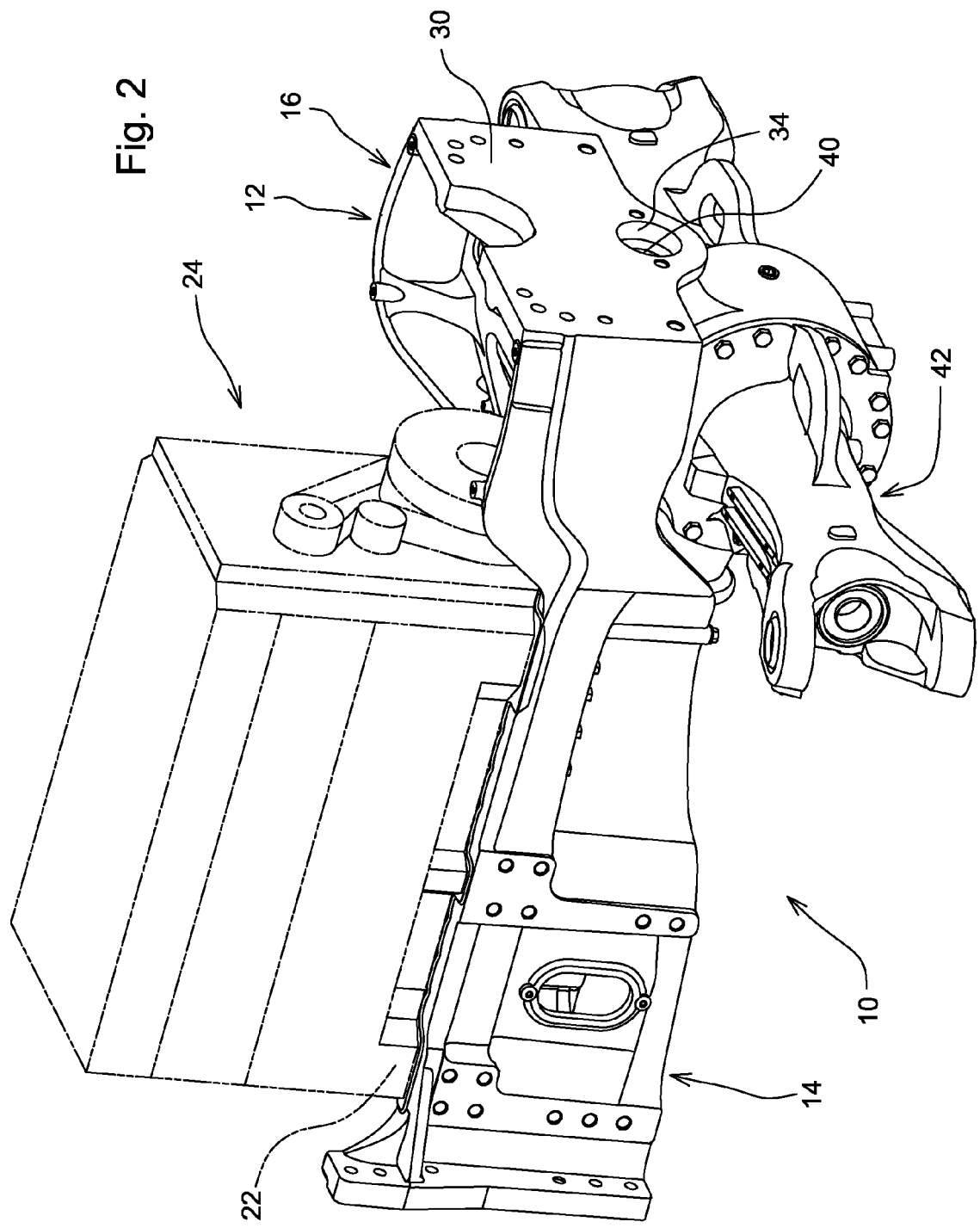
FIG. 2 is a perspective view of the oil pan of FIG. 1.
Figure 3:
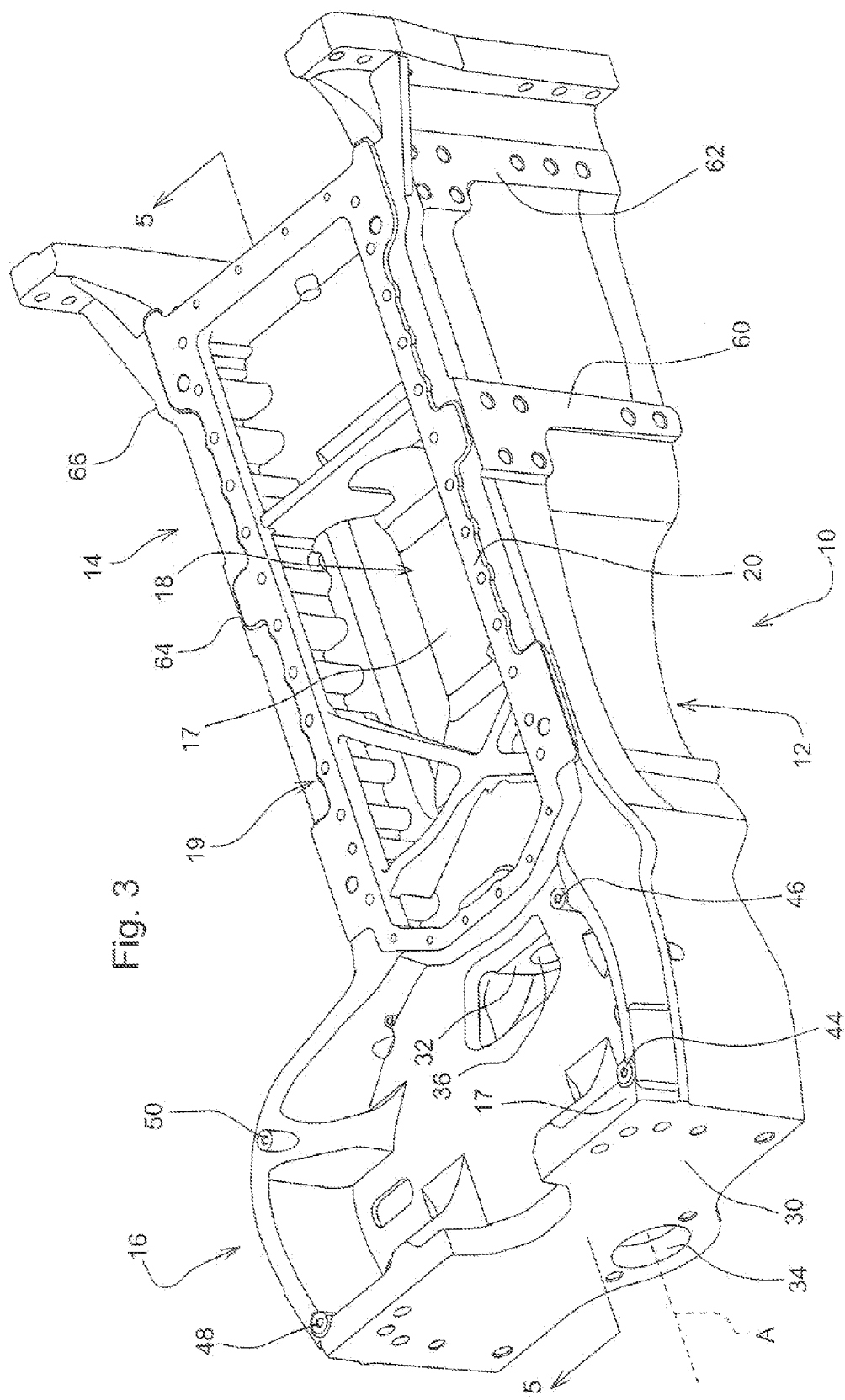
FIG. 3 is a perspective top view of the oil pan of FIG. 1 without the engine or the front axle.
Figure 4:
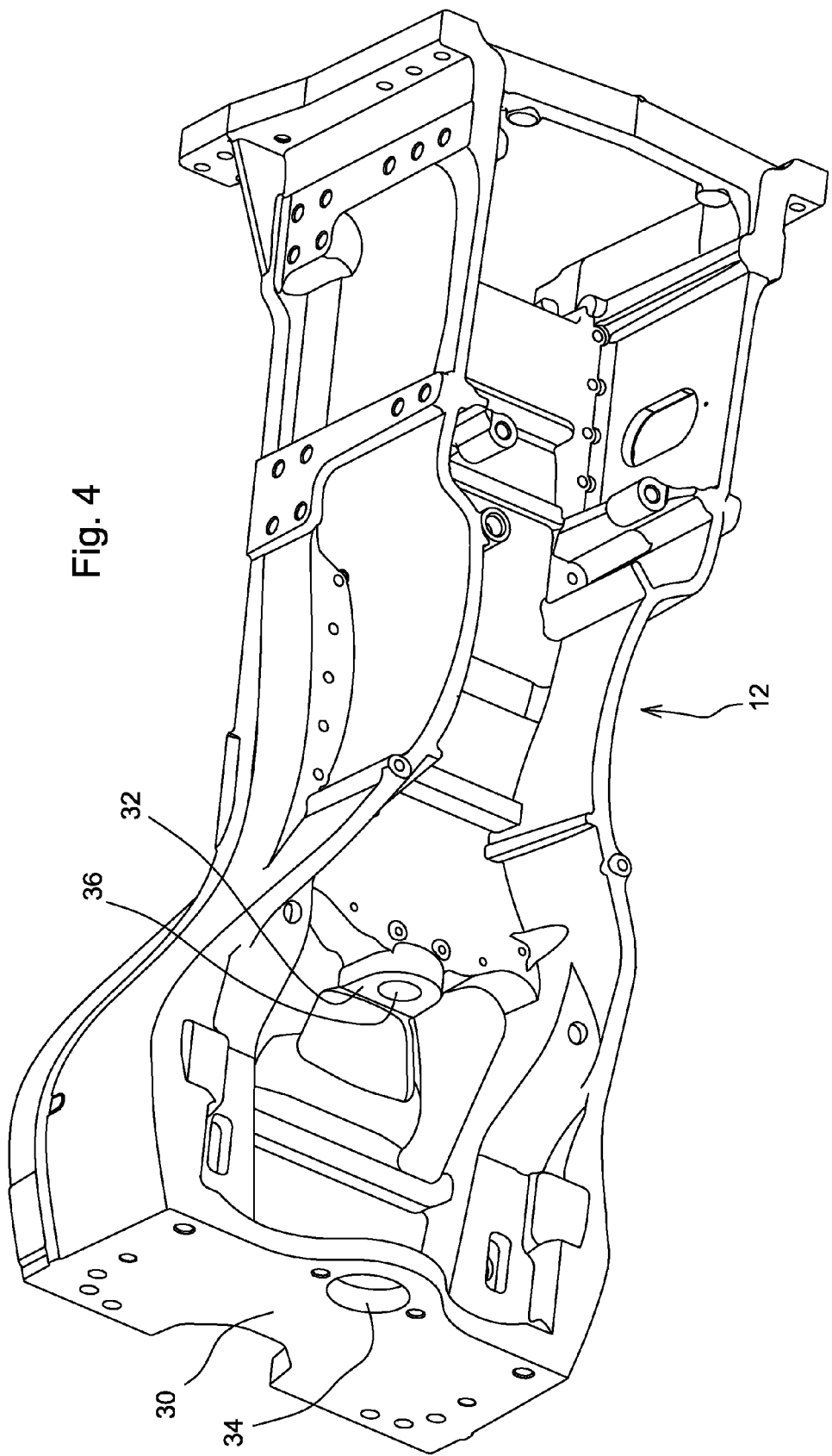
FIG. 4 is a perspective bottom view of the oil pan of FIG. 1 without the engine or the front axle.

The aft portion 14 forms an engine oil reservoir 18 with a floor 17 surrounded by a rim 19. Rim 19 forms an upwardly facing sealing surface 20 for engagement with a bottom surface of a block 22 of an engine 24. The block 22 of engine 24 is mounted to the sealing surface 20 so that the front of the engine block 22 is rearward of the forward portion 16 of the oil pan 10, as best seen in FIG. 1.

Figure 5:
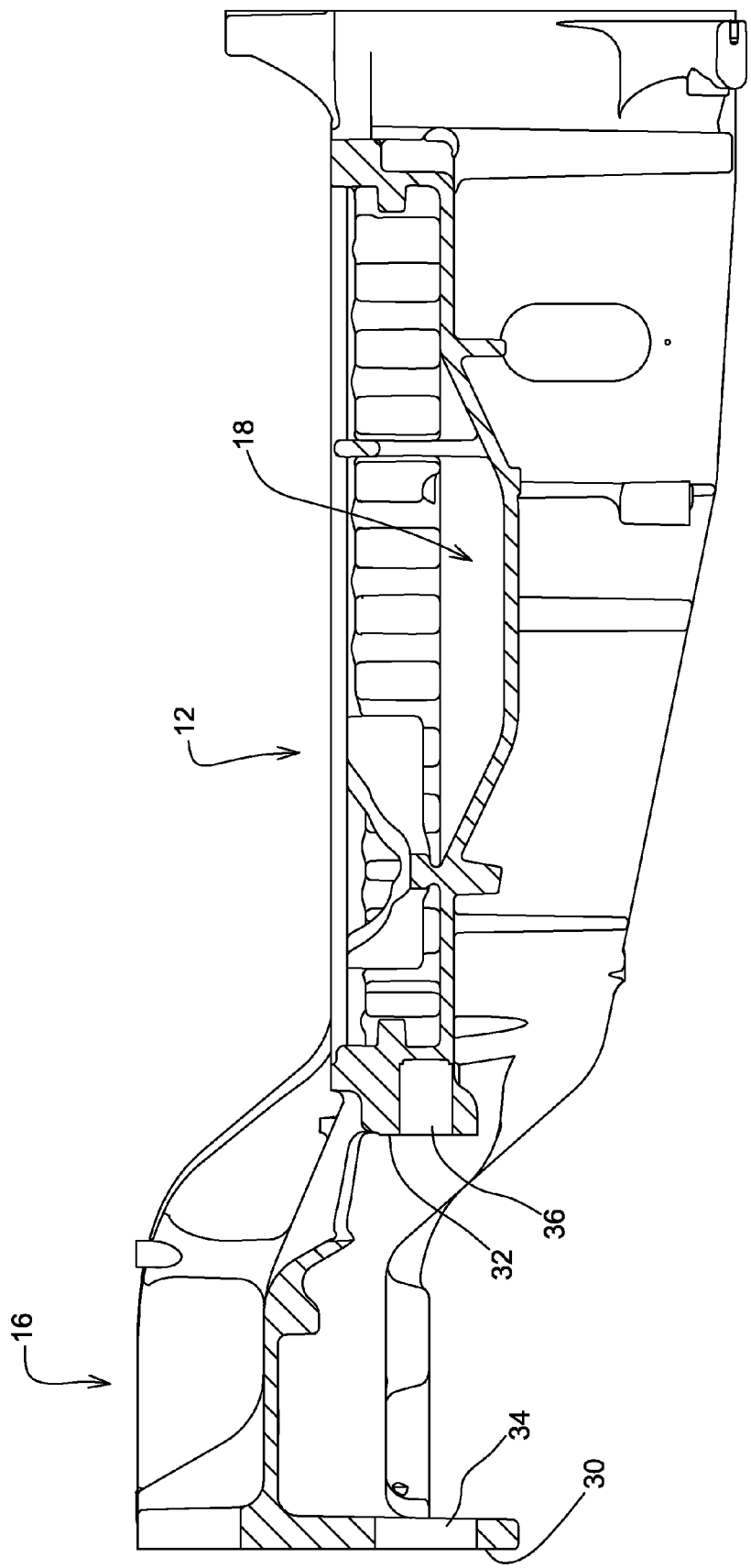
FIG. 5 is a sectional view along lines 5-5 of FIG. 3.

The forward portion 16 extends forward and above the aft portion 14 and forms a front wall 30 and a rear wall 32. A pair of fore-and-aft spaced apart pivot bores 34 and 36 extend through walls 30 and 32, respectively. Bores 34 and 36 are adapted to receive a front axle pivot pin 40, so that the front axle 42 is spaced forward with respect to a front portion of the engine 24. The forward portion 16 has an upper edge 17 which is positioned higher than the sealing surface 20 of the aft portion 14. As best seen in FIG. 5, the front axle pivot bore 30 has an axis A which is above the floor 17 of the engine oil reservoir.

Radiator mounting bosses 44, 46, 48 and 50 are formed on upper side surfaces 52 and 54 of the forward oil pan portion 16. The bosses are forward and above the sealing surface 20 of the aft portion 14. A first pair of loader mounting flanges 60, 62, are formed on a left side of the aft portion 14, and a second pair of loader mounting flanges 64, 66 are formed on a right side of the aft portion 14.

This oil pan/axle support assembly requires no bolted joint between an oil pan which is separate from an axle support. This requires less material, reduces the amount of machining and reduces the number of parts. Instead, there is a seamless flow of casted material from the oil pan to the front axle support. The front end of this oil pan/axle support assembly is in front of the axle where it can be connected to a front hitch casting (not shown) or a vehicle frame front support (not shown). Thus, the joint at the front end of this oil pan/axle support assembly will be required to support only front hitch and weight loads only. The structure is very resistant to chassis torsion load. Using this structural oil pan improves turning radius and lowers the overall chassis weight needed for higher horsepower levels.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An oil pan/axle support comprising:
    a rigid structural housing capable of forming a portion of a frame of a vehicle, the housing having an aft portion and a forward portion;
    the aft portion forming an engine oil reservoir surrounded by a rim, the rim having an upwardly facing sealing surface for engagement with a block of an engine; and
    the forward portion extending forward from the aft portion and forming a pair of fore-and-aft spaced apart pivot bores for receiving a front axle pivot pin so that the front axle is spaced forward with respect to a front portion of the engine, and the forward portion having an upper edge positioned higher than the rim of the aft portion.

2. The oil pan/axle support of claim 1, wherein:
    radiator mounting bosses are formed on upper side surfaces of the forward oil pan portion, said bosses being forward and above the rim of the aft portion.

3. The oil pan/axle support of claim 1, wherein:
loader mounting flanges are formed on the sides of the aft portion.

4. The oil pan/axle support of claim 3, wherein:
the loader mounting flanges are formed on a rear portion of the aft portion.

5. The oil pan/axle support of claim 1, wherein:
a first pair of loader mounting flanges are formed on a left side of the aft portion, and a second pair of loader mounting flanges are formed on a right side of the aft portion.

6. The oil pan/axle support of claim 1, wherein:
the front axle pivot pin has an axis which is above a floor of the engine oil reservoir.

7. An oil pan/axle support comprising:
a rigid structural housing capable of forming a portion of a frame of a vehicle, the housing having an aft portion and a forward portion;
the aft portion forming an engine oil reservoir having a floor surrounded by a rim, the rim having an upwardly facing sealing surface for engagement with a block of an engine; and
the forward portion extending forward from the aft portion and forming a pair of fore-and-aft spaced apart pivot bores for receiving a front axle pivot pin, the pivot bores defining an axis which is above the floor of the engine oil reservoir.

\* \* \* \* \*